(12) United States Patent
Weilguni et al.

(10) Patent No.: US 10,638,575 B2
(45) Date of Patent: Apr. 28, 2020

(54) ELECTRONIC ARRANGEMENT, OPTICAL GAS SENSOR INCLUDING SUCH AN ELECTRONIC ARRANGEMENT, AND METHOD FOR CONTROLLING THE POWER OF A RADIATION SOURCE USING SUCH AN ELECTRONIC ARRANGEMENT

(71) Applicant: E+E Elektronik Ges.m.b.H., Engerwitzdorf (AT)

(72) Inventors: Michael Weilguni, Hagenberg (AT); Federico Filosomi, Linz (AT)

(73) Assignee: E+E ELEKTRONIK GES M.B.H., Engerwitzdorf (AT)

( * ) Notice: Subject to any disclaimer, the term of this patent is extended or adjusted under 35 U.S.C. 154(b) by 0 days.

(21) Appl. No.: 16/443,906

(22) Filed: Jun. 18, 2019

(65) Prior Publication Data
US 2019/0394864 A1    Dec. 26, 2019

(30) Foreign Application Priority Data

Jun. 21, 2018  (EP) .................................... 18179005

(51) Int. Cl.
*H05B 39/09*  (2006.01)
*G01N 21/27*  (2006.01)

(52) U.S. Cl.
CPC ............. *H05B 39/09* (2013.01); *G01N 21/27* (2013.01); *G01N 2201/0696* (2013.01)

(58) Field of Classification Search
None
See application file for complete search history.

(56) References Cited

U.S. PATENT DOCUMENTS

| | | |
|---|---|---|
| 5,095,270 A | 3/1992 | Ludeke |
| 6,023,069 A | 2/2000 | Steinthal et al. |
| 6,347,544 B1 | 2/2002 | Hada et al. |
| 2009/0021970 A1 | 1/2009 | Fukumoto |
| 2012/0007532 A1 | 1/2012 | Baglino et al. |
| 2013/0265807 A1 | 10/2013 | Lee et al. |
| 2016/0172855 A1 | 6/2016 | Cardillo |
| 2019/0098723 A1* | 3/2019 | Sadwick ............ H05B 33/0866 |

* cited by examiner

*Primary Examiner* — Dedei K Hammond
(74) *Attorney, Agent, or Firm* — Leydig, Voit & Mayer, Ltd.

(57) ABSTRACT

An electronic arrangement includes a radiation source. A controlled voltage converter is configured to provide a lamp voltage for the radiation source for operating the radiation source in an ON state for a pulse duration, and to regulate the lamp voltage such that a reference voltage at a feedback terminal of the voltage converter is maintained substantially constant. A voltage source is connected to the feedback terminal and configured to provide, via the feedback terminal for acting on the regulation of the voltage converter, a time-dependent control voltage having a predefined time profile. The voltage converter is configured to select a time profile for the lamp voltage as a function of the predefined time profile of the time-dependent control voltage such that a power of the radiation source deviates from a constant power value by no more than 25% during at least 90% of the pulse duration.

15 Claims, 5 Drawing Sheets

ELECTRONIC ARRANGEMENT, OPTICAL GAS SENSOR INCLUDING SUCH AN ELECTRONIC ARRANGEMENT, AND METHOD FOR CONTROLLING THE POWER OF A RADIATION SOURCE USING SUCH AN ELECTRONIC ARRANGEMENT

CROSS-REFERENCE TO PRIOR APPLICATION

Priority is claimed to European Patent Application No. EP 18179005.6, filed on Jun. 21, 2018, the entire disclosure of which is hereby incorporated by reference herein.

FIELD

The present invention relates to an electronic arrangement and an optical gas sensor including such an electronic arrangement. This invention also relates to a method for controlling the power of a radiation source using such an electronic arrangement. The devices according to the invention and the method according to the invention can be used, in particular, in connection with an infrared radiation source in an optical gas sensor.

BACKGROUND

Optical gas sensors often include an infrared radiation source (e.g., in the form of an incandescent lamp) which emits thermal radiation onto a gas received in a measurement cell. The gas absorbs a portion of radiation at certain wavelengths. A detector, such as a photodiode, then detects at least portions of the thermal radiation that has passed through the measurement cell and provides a corresponding signal (e.g., in the case of a photodiode, a photocurrent) from which a gas concentration in the measurement cell can be determined.

For such a measurement, the radiation source is typically turned on for a certain pulse duration (such as, for example, several 100 ms) to generate a radiation pulse. At the beginning of the pulse duration, a relatively high peak inrush current can occur. This is true, in particular, of radiation sources exhibiting PTC behavior; i.e., radiation sources which have a positive temperature coefficient. This means that an electrical resistance of the radiation source is lower at low temperatures (e.g., at room temperature at turn-on) than at higher temperatures (e.g., some time after turn-on). Radiation sources used in optical gas sensors typically exhibit such a PTC behavior.

In incandescent lamps, such unwanted peak inrush currents can occur due to the PTC behavior and can exceed the actual operating current by a factor of 8 to 10. The peak inrush currents must be provided by the power supply of the gas sensor and must, therefore, be taken into account in the design of the system. In the case of bus-powered systems, for example, this may require relatively large (and expensive) energy buffers. In battery-operated systems, high peak inrush currents can decrease the life of the battery. Therefore, a lowest possible peak inrush current is a selection criterion for users of optical gas sensors and, consequently, an important design goal for manufacturers. In a conceivable ideal case, for example, it would be desirable that no peak inrush current be perceivable at all; i.e., that the current have a rectangular waveform and that the power consumption be substantially constant over the duration of the pulse.

In some commercially available $CO_2$ sensors, a dropping resistor is used to reduce the peak inrush current. However, this relatively inexpensive approach has the disadvantage that the dropping resistor is connected in series with the radiation source throughout the entire pulse duration and, therefore, consumes energy permanently. It is true that the higher the selected value of the dropping resistor, the lower will be the peak inrush current, but the lower will also be the energy effectively available to the radiation source for emission.

In other commercially available $CO_2$ sensors, the radiation source is operated at constant current, whereby, inherently, peak currents do not occur. This approach has the disadvantage that the voltage at the radiation source is initially relatively low, but rises more than proportionately with time. A selectable maximum current or the pulse duration is thereby limited because otherwise the voltage at the radiation source would drive the current source into saturation. In addition, in the case of constant-current operation, the voltage, and thus the power, at the radiation source exhibit a pronounced temperature dependence. Moreover, an aging effect of the light source; i.e., an increase in (cold) resistance over the lifetime of the radiation source, is intensified by the constant-current operation because, unlike the constant-voltage operation, an increased cold resistance does not result in a smaller current and, therefore, the circuit experiences no self-regulation.

US 2016/0172855 A1 proposes to apply a constant electrical power to a resistive load, such as, for example, an IR emitter in a Fourier transform infrared (FTIR) spectrometer. In U.S. Pat. No. 5,095,270, too, constant power is supplied to an IR light source in a gas sensor. In both cases, a current sensor and an (analog) multiplier are needed to regulate the power.

U.S. Pat. No. 6,023,069 proposes to operate a radiation source at a quasi-constant power over the lifetime thereof and, for this purpose, to connect suitable resistors between a voltage source and the radiation source. However, the dynamic behavior of the radiation source is not taken into account in this approach.

SUMMARY

In an embodiment, the present invention provides an electronic arrangement including a radiation source. A controlled voltage converter is configured to provide a lamp voltage for the radiation source in order to operate the radiation source in an ON state for a pulse duration, and to regulate the lamp voltage in such a way that a reference voltage at a feedback terminal of the voltage converter is maintained substantially constant. A voltage source is connected to the feedback terminal and configured to provide, via the feedback terminal for acting on the regulation of the voltage converter, a time-dependent control voltage having a predefined time profile. The voltage converter is configured to select a time profile for the lamp voltage as a function of the predefined time profile of the time-dependent control voltage in such a way that a power of the radiation source deviates from a constant power value by no more than 25% during at least 90% of the pulse duration.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
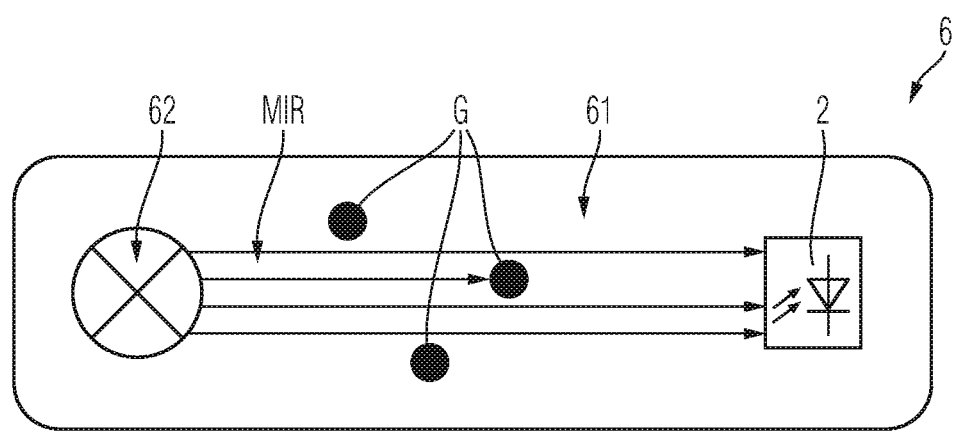
FIG. 1 shows exemplarily and schematically an optical gas sensor.

It is recognized in the present invention that, in the aforementioned prior art approaches, current peaks can still occur upon turn-on due to the PTC-behavior of the radiation source.

Embodiments of the present invention provide an electronic arrangement and a method that allow peak inrush currents of a radiation source, for example in an optical gas sensor, to be avoided or reduced with relatively little circuit complexity. Another embodiment provides an optical gas sensor having such properties.

In order to attain these improvements, there are provided an electronic arrangement, an optical gas sensor, and a method for controlling the power of a radiation source according to embodiments of the present invention. Features of several exemplary embodiments are specified herein and may be combined to form further embodiments, unless explicitly stated otherwise. The hereinafter described features of the electronic arrangement may also be correspondingly implemented in the optical gas sensor and vice versa. Likewise, features of the method may be reflected in features of the electronic arrangement and/or of the optical gas sensor and vice versa.

In accordance with a first embodiment, an electronic arrangement includes a radiation source and a controlled voltage converter. The radiation source may in particular be an infrared radiation source. For example, the radiation source may be an incandescent lamp or a thin-film emitter. The voltage converter is configured to provide a lamp voltage for the radiation source in order to operate the radiation source in an ON state for a pulse duration. The voltage converter is configured to regulate the lamp voltage in such a way that a reference voltage at a feedback terminal of the voltage converter is maintained substantially constant. The electronic arrangement further includes a voltage source connected to the feedback terminal, the voltage source being configured to provide a time-dependent control voltage having a predefined time profile and to thereby act, via the feedback terminal, on the regulation of the voltage converter in such a manner that the voltage converter selects a time profile for the lamp voltage as a function of the predefined time profile of the control voltage in such a way that a power of the radiation source deviates from a constant power value by no more than 25% (such as, for example, no more than 20%, no more than 10%, or no more than 5%) during at least 90% (such as, for example, at least 95%, or even at least 99%) of the pulse duration. In a preferred embodiment, the power of the radiation source may deviate from a constant power value by no more than 25% (such as, for example, no more than 20%, no more than 10%, or no more than 5%) during the entire pulse duration.

In the context of the present application, a statement according to which an electrical element is "connected" to another electrical element means that a low-resistance electrical connection exists between the two electrical elements.

Furthermore, the term "ground" should hereinafter be understood to refer to a structure that provides a reference potential. This may, but need not necessarily, be the ground potential.

When the description below refers to "lamp," "lamp current," "lamp power," "lamp resistance," etc., these terms should be understood to mean the respective electrical quantities of or at the radiation source, regardless of the type of radiation source.

The radiation source may be, for example, an infrared radiation source. In particular, the radiation source may exhibit a PTC behavior, which means that an electrical resistance of the radiation source has a positive temperature coefficient. Examples of such radiation sources include incandescent lamps and thin-film emitters.

A second embodiment of the present invention relates to an optical gas sensor including an electronic arrangement according to the first embodiment of the invention.

A third embodiment provides a method for controlling the power of a radiation source, which method includes the following steps: providing an electronic arrangement according to the first embodiment of the invention; operating the radiation source in the ON state for the pulse duration; and providing the time-dependent control voltage in such a manner that the power of the radiation source deviates from a constant power value by no more than 25% (such as, for example, no more than 20%, no more than 10%, or no more than 5%) during at least 90% (such as, for example, at least 95%, or even at least 99%) of the pulse duration. Preferably, the power of the radiation source may deviate from a constant power value by no more than 25% (such as, for example, no more than 20%, no more than 10%, or no more than 5%) even during the entire pulse duration.

In the following, reference is made to all three of the aforementioned embodiments.

Embodiments of the present invention are based on the concept that peak inrush currents in a radiation source can be reduced or even completely avoided by operating the radiation source at a quasi-constant power during a pulse duration, knowing and taking into account the dynamic behavior of the radiation source. In this connection, the power is not regulated, but controlled via a suitable time-dependent control voltage.

A time profile of the control voltage is established in advance; i.e., predefined, for example, taking into account electrical and/or thermal properties of the radiation source. In other words, the time profile of the control voltage is not dependent, for example, on current (currently measured) electrical quantities at the radiation source, such as, for example, a lamp current, a lamp voltage, or a lamp power. Hence, the lamp power is not regulated, and thus the method for controlling the power of the radiation source does not require measurement of a lamp current or lamp voltage. Accordingly, the electronic arrangement does not require current or voltage sensors at the radiation source. However, the time profile of the control voltage may be established as a function of parameters that are known in advance (i.e., before the pulse duration begins), such as, for example, electrical and/or thermal parameters of the electrical arrangement (including the radiation source) and/or an ambient temperature. For example, the time profile of the control voltage may be established as a function of a thermal resistance and/or a thermal capacity of the radiation source.

In accordance with an embodiment, the time profile of the control voltage is selected such that a peak inrush current of an input current into the voltage converter, which peak inrush current may occur at the beginning of the pulse duration, has a magnitude less than or equal to 1.25 times an input current value averaged over the pulse duration. Preferably, the peak inrush current may have a magnitude less than or equal to 1.2 times, less than or equal to 1.1 times, or even less than or equal to 1.05 times the input current value averaged over the pulse duration.

In a variant, the electronic arrangement includes a voltage divider including a first resistor and a second resistor connected in series. The voltage divider is connected via its first resistor to the radiation source. Thus, the voltage divider can, for example, tap the lamp voltage via its first resistor. In addition, the voltage divider may at the same time be connected via its first resistor to an output terminal of the voltage converter. The voltage divider is connected via its second resistor to a ground terminal of the electronic arrangement. In other words, the voltage divider may be connected via its second resistor to a ground potential during normal operation of the electronic arrangement. The feedback terminal is connected to the voltage divider in a region between the first resistor and the second resistor. This means that the feedback terminal taps a potential between the first resistor and the second resistor.

In addition, in accordance with an embodiment, the voltage source may be connected to the feedback terminal of the voltage converter, for example, via a third resistor. Furthermore, the voltage source may be connected (e.g., via the third resistor) to the voltage divider in a region between the first resistor and the second resistor.

It is within the scope of the present invention that the voltage source may be or include a digital-to-analog converter, in particular a buffered digital-to-analog converter, the time-dependent control voltage being provided as an output voltage of the digital-to-analog converter.

In accordance with an embodiment, the time-dependent control voltage is provided in such a way that, during the pulse duration, it deviates no more than 20% (such as, for example, no more than 10%, or no more than 5%) from a time profile determined by the following equation:

$$v_{DAC} = v_{FB} \frac{R_3}{R_1}\left(1 + \frac{R_1}{R_2} + \frac{R_1}{R_3}\right) - \frac{R_3}{R_1}\sqrt{P_{LP}R_{LP,25°\,C.}\left[1 + \alpha\left(R_{th}P_{LP}\left(1 - e^{-\frac{t}{R_{th}C_{th}}}\right) + T_{amb} - 25°\,C.\right)\right]}$$

where:
$P_{LP}$ is a predetermined constant power value,
$R_{LP,25°\,C.}$ is an electrical resistance of the radiation source at 25° C.,
$\alpha$ is a temperature coefficient of the radiation source,
$R_{th}$ is a thermal resistance of the radiation source,
$C_{th}$ is a thermal capacity of the radiation source, and
$T_{amb}$ is an ambient temperature.

FIG. 1 illustrates, in schematic and exemplary form, an optical gas sensor 6 whose basic design is known in the art. Here, an infrared radiation source 62 (e.g., an incandescent lamp or a thin-film emitter) emits thermal radiation MIR. Measurement cell 61, which contains the gas G to be measured (e.g., $CO_2$), is located between a detector (here represented, by way of example, as a photodiode 2) and radiation source 62. Gas G absorbs a portion of thermal radiation MIR at certain wavelengths. Depending on the gas concentration, more or less photocurrent is delivered by photodiode 2. Thus, a signal from photodiode 2 can be used for determining the concentration of the gas.

Figure 2A:
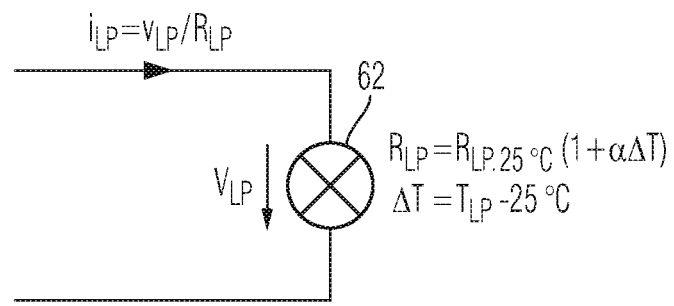
FIG. 2A shows exemplarily and schematically a simple electrical model of a radiation source.
Figure 2B:
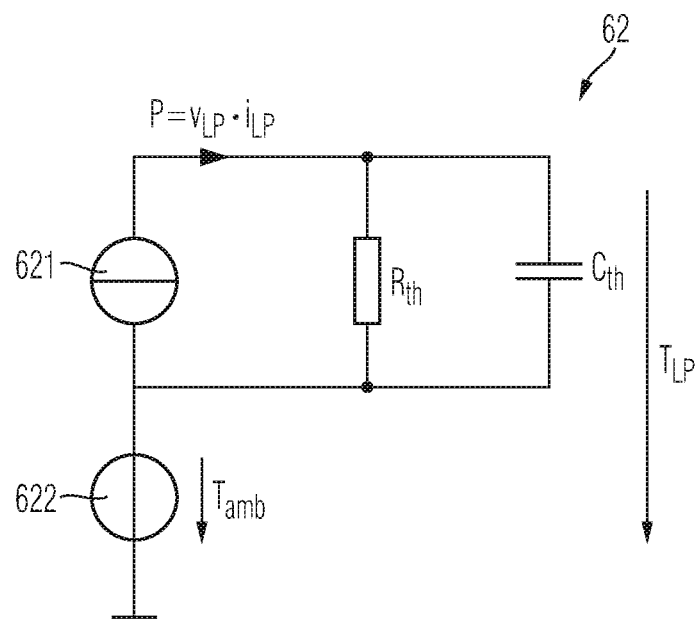
FIG. 2B shows exemplarily and schematically a simple thermal model of the radiation source of FIG. 2A.

FIGS. 2A and 2B illustrate, in schematic and exemplary form, simple electrical and thermal models of a radiation source 62, such as may be used, for example, in the above-described optical gas sensor 6. Radiation source 62, here, for example, an incandescent lamp, is modeled, in a first approximation, as a temperature-dependent electrical resistance $R_{LP}$ (see FIG. 2A) having a thermal capacity $C_{th}$ and a thermal resistance $R_{th}$ (see FIG. 2B). Lamp voltage $v_{LP}$ drops across electrical resistance $R_{LP}$. The corresponding lamp current is $i_{LP}=v_{LP}/R_{LP}$. The temperature-dependent lamp resistance $R_{LP}$ arises from the lamp resistance at 25° C., $R_{LP,25°\,C.}$, the temperature of the lamp filament $T_{LP}$, and the temperature coefficient $\alpha$ of the filament:

$$R_{LP}(t)=R_{LP,25°\,C.}[1+\alpha(T_{LP}(t)-25°\,C.)] \quad (1)$$

The temperature of lamp filament $T_{LP}$, in turn, depends on ambient temperature $T_{amb}$ and the additional heating caused by the introduction of energy. In the equivalent thermal circuit diagram of FIG. 2B, a heat source 621 represents the Joule heat power $P_{LP}=v_{LP}\,i_{LP}$ converted at the filament, and a symbolic "voltage source" represents ambient temperature $T_{amb}$, which corresponds to the temperature of the lamp filament $T_{LP}$ in the OFF state. According to the equivalent thermal circuit diagram of FIG. 2B, a thermal capacity $C_{th}$ of the filament causes the following dynamic behavior:

$$P_{LP} = v_{LP}i_{LP} = \frac{(T_{LP} - T_{amb})}{R_{th}} + C_{th}\frac{d(T_{LP} - T_{amb})}{dt} \quad (2)$$

This dynamic will be used below to calculate a possible time profile of a control voltage $v_{DAC}$.

Figure 3:
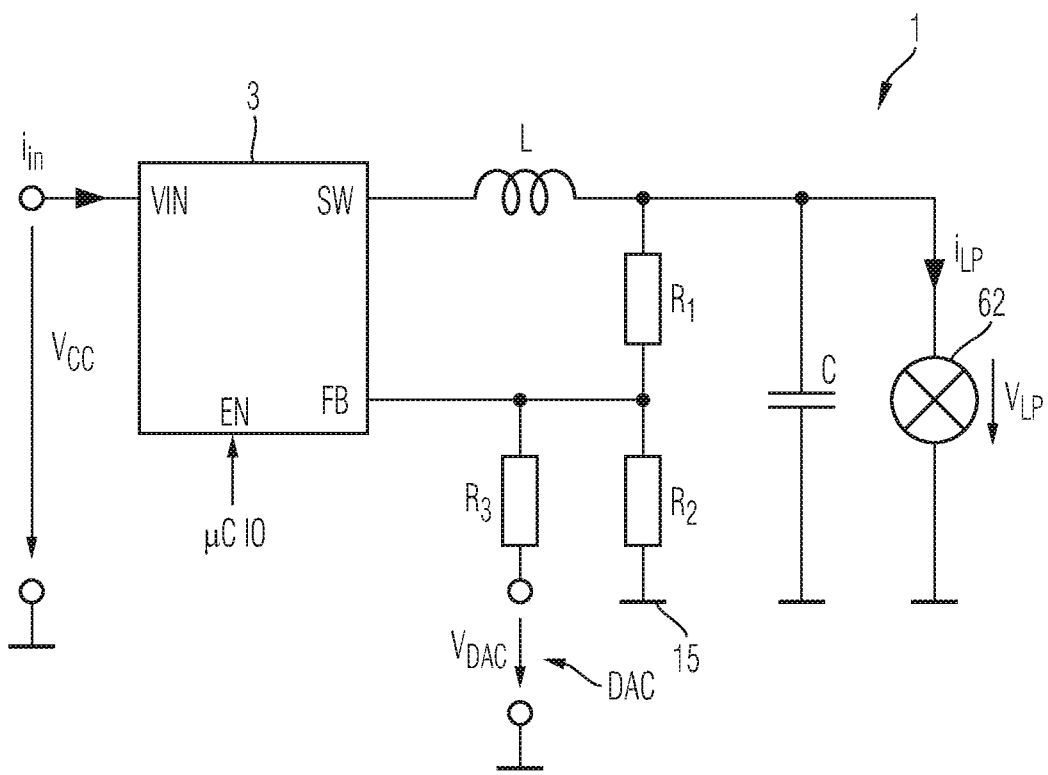
FIG. 3 shows exemplarily and schematically an electronic arrangement in accordance with one or more embodiments.

FIG. 3 illustrates, in schematic and exemplary form, an electronic arrangement 1 in accordance with one or more embodiments. In the exemplary embodiment shown, the problem of the peak inrush currents is solved using a voltage converter 3 in the form of a DC/DC buck converter. In a buck converter, an output voltage must always be lower than an input voltage. However, alternatively, an electronic arrangement according to the present invention can also be implemented using a buck-boost converter, where the output voltage can be lower or higher than the input voltage.

The buck converter 3 shown has an input terminal VIN, an output terminal SW (common designation for "switch node"), a control input EN, as well as a feedback terminal FB. A supply voltage $V_{cc}$ is applied to input terminal VIN. Output terminal SW is connected to radiation source 62. Inductance L and capacitance C shown in FIG. 3 belong functionally to voltage converter 3. Strictly speaking, the element designated 3 in FIG. 3 represents only a control module for a buck converter. Frequently, such control modules are commercially offered under the name "buck converter," and components functionally belonging to voltage converter 3, such as, for example, coils and capacitors providing a corresponding inductance L and a corresponding capacitance C, are provided as needed by the user, e.g., on a printed circuit board.

In the exemplary embodiment shown, electronic arrangement 1 further includes a microcontroller μC connected to control input EN. Microcontroller μC is configured to turn a switching element of buck converter 3 ON or OFF by providing a corresponding control signal (EN=«High» or «Low»). In the OFF state of buck converter 3 (EN=«Low» permanently), the circuit hardly requires current (~μA). During a lamp pulse (i.e., during a pulse duration $t_P$, which may be in the range of from 50 ms to 500 ms, for example), microcontroller μC controls buck converter 3 via control input EN such that coil L is constantly turned on and off (e.g., at a frequency in the range of from 100 kHz to 1 MHz). An internal feedback control loop of buck converter 3 ensures that, on average, lamp voltage $v_{LP}$ is produced at the output of the circuit; i.e., at radiation source 62, by the interaction of the switching element, inductance L and capacitance C. The basic operating principle of a buck converter 3 and other types of controlled voltage converters 3 is known to those skilled in the art.

As already explained with reference to FIG. 2A, lamp current $i_{LP}=v_{LP}/R_{LP}$ results from a given lamp voltage $v_{LP}$ across lamp resistance $R_{LP}$. In a first approximation, electronic arrangement 1 has a constant efficiency η, e.g., on the order of η=90%. Accordingly, the ratio of input power to output power is given by the following equation:

$$P_{out}=P_{LP}=P_{in}\cdot\eta=V_{cc}i_{in}\eta.$$

Input current $i_{in}$ is derived therefrom as:

$$i_{in} = \frac{v_{LP}i_{LP}}{V_{cc}\,\eta}.$$

This input current $i_{in}$ is «seen» by the user (i.e., must be provided from outside), and therefore should, to the extent possible, be free of peaks, in particular inrush current peaks. This is achieved in accordance with the present invention by maintaining the product $v_{LP}\,i_{LP}$ at least approximately constant over the pulse duration $t_P$ of the lamp pulse. In particular, under the assumption of a constant supply voltage $V_{cc}$ and according to the above equation, input current $i_{in}$ then also remains free of peaks.

The following is an explanation of how lamp power $P_{LP}$ can be maintained substantially constant over pulse duration $t_P$ using an electronic arrangement 1 of the type shown in FIG. 3.

DC-to-DC converters are typically designed for a constant output voltage. For example, in case of the buck converter 3 shown in FIG. 3, a constant lamp voltage $v_{LP}$ could be set by a voltage divider which, as illustrated, includes a series connection of a first resistor $R_1$ and a second resistor $R_2$. The voltage divider is connected via its first resistor $R_1$ to radiation source 62 and via its second resistor $R_2$ to a ground terminal 15 of electronic arrangement 1. Ground terminal 15 does not need to be a dedicated terminal in the sense of a socket, or the like, but rather may simply be in the form of, for example, a connection to a housing (e.g., of optical gas sensor 6) or to any other element of electronic arrangement 1 that is connected to ground during normal operation.

Feedback terminal FB of buck converter 3 is connected to the voltage divider in a region between first resistor $R_1$ and second resistor $R_2$. Due to its internal feedback control loop, buck converter 3 is configured to regulate lamp voltage $v_{LP}$ in a such a way that a reference voltage $v_{FB}$ at feedback terminal FB is maintained substantially constant (e.g., substantially at a predetermined reference value).

In the exemplary embodiment shown, a time-dependent voltage source DAC, here, by way of example, in the form of an output of a buffered digital-to-analog converter DAC, is connected via a third resistor $R_3$ to the voltage divider in a region between first resistor $R_1$ and second resistor $R_2$. At the same time, the output of digital-to-analog converter DAC is connected to feedback terminal FB. A time-dependent control voltage $v_{DAC}$ having a specific time profile may be set at the output of digital-to-analog converter DAC. For example, the time profile of control voltage $v_{DAC}$ may be set at the output of digital-to-analog converter DAC piece by piece by a microcontroller.

Through targeted setting of the time profile of control voltage $v_{DAC}$, it is possible to obtain a desired time profile of lamp voltage $V_{LP\,can}$. In the present exemplary embodiment, the relationship between control voltage $v_{DAC}$ and lamp voltage $v_{LP}$ resulting from the voltage divider and the feedback control of reference voltage $v_{FB}$ is given by the following equation:

$$v_{LP} = -\frac{R_1}{R_3}v_{DAC} + v_{FB}\left(1 + \frac{R_1}{R_2} + \frac{R_1}{R_3}\right) \quad (3)$$

Reference voltage $v_{FB}$ at feedback output FB is set by buck converter 3 and may, for example, be in a range of from 0.6 V to 0.9 V. Resistors $R_1$, $R_2$ and $R_3$ are preferably selected such that a control range of digital-to-analog converter DAC, including the buffer, can cover the desired lamp voltage $v_{LP}$ (e.g., in a range of from 0.6 V to 2.4 V).

In the following, a time profile of control voltage $v_{LP}(t)$ that will produce a most constant profile of lamp power $P_{LP}$ during pulse duration $t_P$ will be established, taking into account the electrical and thermal models of radiation source 62 described above with reference to the FIGS. 2A-B. If a desired constant lamp power $P_{LP}$ is assumed for derivation purposes, the above equation (2) becomes a differential equation which can be solved using the following ansatz:

$$T_{LP}(t)-T_{amb}=R_{th}P_{LP}(1-e^{-t/\tau}),\text{ where }\tau=R_{th}C_{th} \quad (4)$$

where parameter t denotes time. When lamp temperature $T_{LP}$ from equation (4) is inserted in equation (1), then, with $$P_{LP}=v_{LP}^2/R_{LP}$$

the time profile of lamp voltage $v_{LP}$ can be calculated as:

$$v_{LP}(t) = \sqrt{P_{LP}R_{LP,25°\,C.}\left[1 + \alpha\left(R_{th}P_{LP}\left(1 - e^{-\frac{t}{R_{th}C_{th}}}\right) + T_{amb} - 25°\,C.\right)\right]} \quad (5)$$

Thus, in this simple lamp model, the profile of lamp voltage $v_{LP}(t)$ can be calculated analytically. By inserting equation (5) into equation (3) and solving the same for control voltage $v_{DAC}$, the appropriate time profile of DAC output voltage $v_{DAC}$ (e.g., of the control voltage) is obtained as:

$$v_{DAC}(t) = v_{FB}\frac{R_3}{R_1}\left(1 + \frac{R_1}{R_2} + \frac{R_1}{R_3}\right) - \quad (6)$$

-continued $$\frac{R_3}{R_1}\sqrt{P_{LP}R_{LP,25°\,C.}\left[1+\alpha\left(R_{th}P_{LP}\left(1-e^{-\frac{t}{R_{th}C_{th}}}\right)+T_{amb}-25°\,C.\right)\right]}$$

where:
- $P_{LP}$ denotes the predetermined (desired) constant power value,
- $R_{LP,25°\,C.}$ denotes the electrical resistance of radiation source 62 at 25° C.,
- $\alpha$ denotes the temperature coefficient of radiation source 62 (e.g. of the filament of an incandescent lamp),
- $R_{th}$ denotes the thermal resistance of radiation source 62,
- $C_{th}$ denotes the thermal capacity of radiation source 62, and
- $T_{amb}$ denotes the ambient temperature of radiation source 62.

Figure 4A:
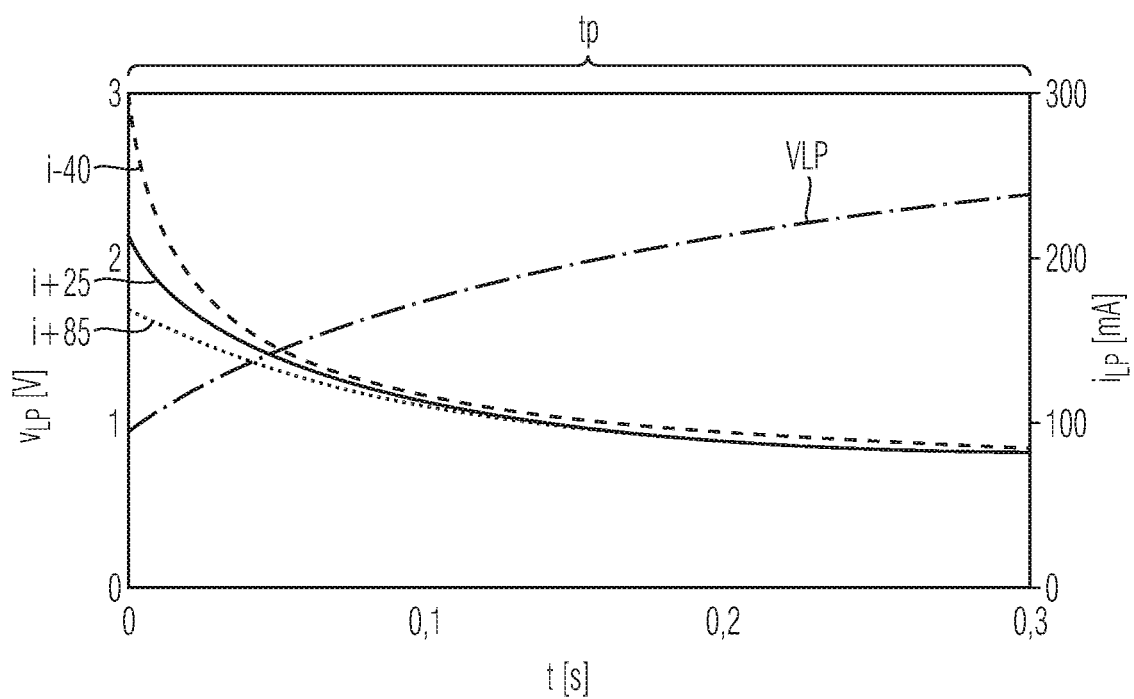
FIG. 4A shows exemplarily and schematically a simulated time profile of a lamp voltage and of a lamp current during a pulse duration at different temperatures.

FIG. 4A illustrates, in schematic and exemplary form, a simulated time profile of lamp voltage $v_{LP}$ and of lamp current $i_{LP}$ during a pulse duration $t_P$=300 ms at three different temperatures, namely 25° C., 85° C. and −40° C. The time profile of control voltage $v_{DAC}$ was in each case calculated according to the above equation (6) for the fixed ambient temperature value $T_{amb}$=25° C. and a desired (quasi-)constant power value of $P_{LP}$=200 mW.

In contrast to lamp current $i_{LP}$, lamp voltage $v_{LP}$ (dash-dotted curve VLP) exhibits no temperature dependence. Solid line curve i+25 shows lamp current $i_{LP}$ at 25° C., dotted curve i+85 shows lamp current $i_{LP}$ at 85° C., and dashed curve i−40 shows lamp current $i_{LP}$ at −40° C. Here too, curve i+25 shows a peak lamp current at the beginning of the pulse. However, due to the control behavior of the buck converter, a constant input current $i_{in}$ is obtained.

In FIG. 4A, it can be seen that at low temperatures, an increased peak inrush current can be observed (see curve i−40). In accordance with a method of the present invention, this can be compensated for by initially measuring ambient temperature $T_{amb}$. During the operation of a $CO_2$ gas sensor 6, ambient temperature $T_{amb}$ is typically measured anyway. Then, the appropriate control voltage profile $v_{DAC}(t)$ is established according to equation (6), taking into account the measured ambient temperature $T_{amb}$, and output at the DAC output. For the determination of control voltage profile $v_{DAC}(t)$, one or more suitable data processing devices, such as, for example, (micro-)processors, may be provided as part of electronic arrangement 1.

Figure 4B:
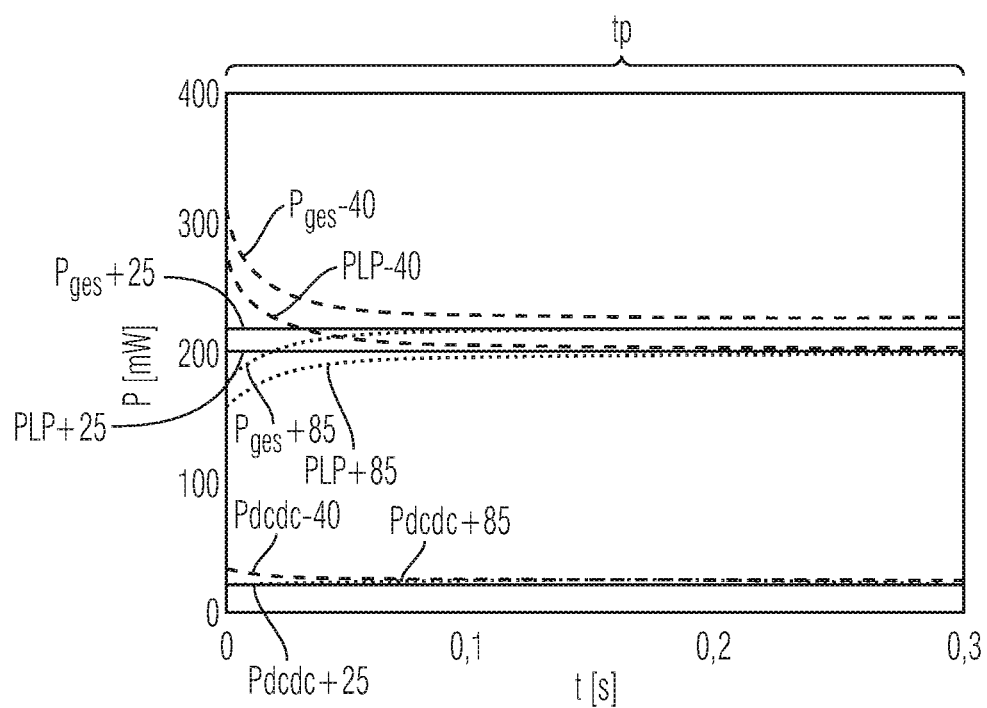
FIG. 4B shows exemplarily and schematically a simulated time profile of a lamp power during a pulse duration at different temperatures.

FIG. 4B shows a simulated time profile of the lamp power during pulse duration $t_P$ at different temperatures (25° C., −40° C., 85° C.). In each case, the lamp power results from the same simulations as the curves in FIG. 4A at the respective temperatures. Solid line curve Pges+25 is a total power of electronic arrangement 1 at 25° C. Solid line curve PLP+25 shows the lamp power at 25° C., which corresponds to predetermined constant power value $P_{LP}$=200 mW. Solid line curve Pdcdc+25 shows a power decreasing in voltage converter 3 at 25° C. Dashed curves Pges−40, PLP−40 and Pdcdc−40 show the total power, the lamp power, and the power decreasing in voltage converter 3, in each case at −40° C. Dotted curves Pges+85, PLP+85 and Pdcdc+85 show the total power, the lamp power, and the power decreasing in voltage converter 3, in each case at 85° C. A comparison of the lamp power with the respective total power illustrates the relatively high efficiency (in the range of η=90%) of electronic arrangement 1. This makes it possible to build efficient gas sensors 6 which exhibit little self-heating.

Figure 5A:
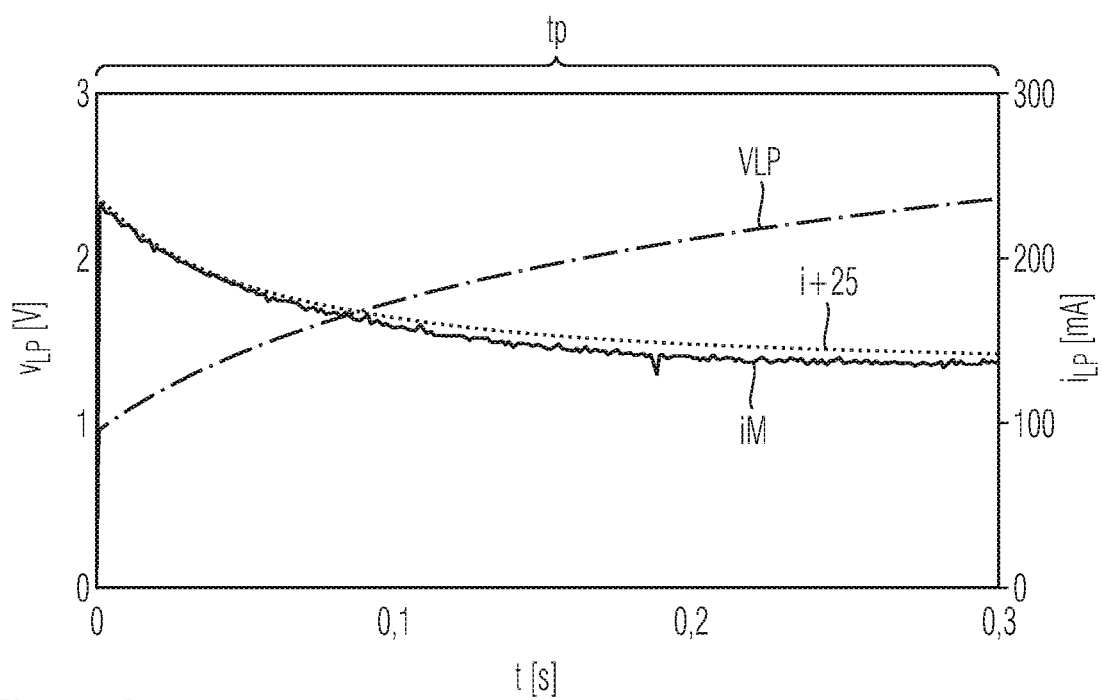
FIG. 5A shows exemplarily and schematically a comparison between a simulated and a measured time profile of a lamp current during a pulse duration.

FIG. 5A illustrates, in schematic and exemplary form, the above, simulated time profile of a lamp current $i_{LP}$ as compared to a measured time profile. In addition to lamp voltage curve VLP and the lamp current curve for 25° C., i+25 (corresponding to curve i+25 of FIG. 4A), there is plotted a measurement curve iM of the lamp current at 25° C.

Figure 5B:
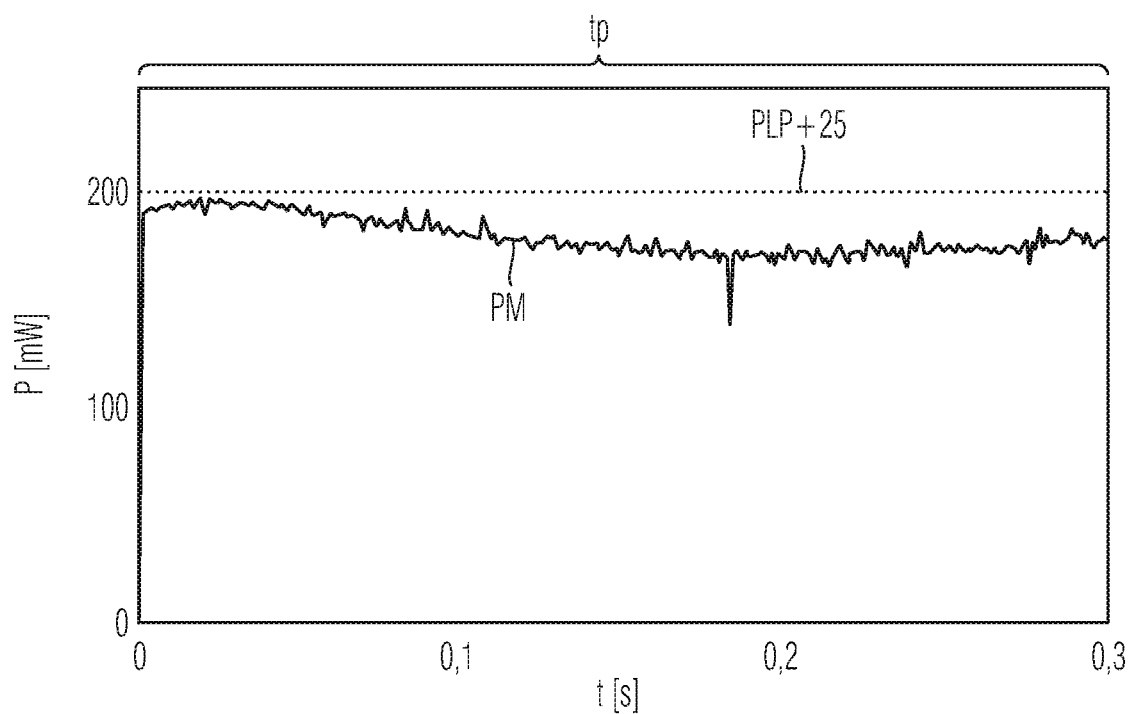
FIG. 5B shows exemplarily and schematically a comparison between a simulated and a measured time profile of a lamp power during a pulse duration.

FIG. 5B shows a corresponding comparison for the time profile of the lamp power. In addition to curve PLP+25 (corresponding to curve PLP+25 of FIG. 4B), there is plotted a corresponding measurement curve PM. Measurement curve PM is substantially constant and deviates from the desired constant power value $P_{LP}$=200 mW by no more than 20% during nearly the entire pulse duration $t_P$ (except for measurement artifacts or noise). Measuring curve PM merely illustrates an exemplary measurement. In practice, even significantly smaller deviations from a desired constant power value $P_{LP}$ during pulse duration $t_P$ can be achieved using the device and method according to the present invention, such as, for example, deviations of no more than 15%, 10%, 5% or even no more than 2%.

It should be noted that the simple lamp model used here by way of example is only a first approximation. Additional effects, such as, for example, a non-constant temperature coefficient of tungsten, lead resistances, temperature dependence of the emissivity, etc. are not taken into account here. It may therefore be expedient to augment equation (6) with additional parameters. Alternatively, the ideal profile of control voltage $v_{DAC}(t)$ could be adapted using polynomials or other approximation methods.

By adapting the profile of lamp voltage $v_{LP}(t)$ to the particular ambient temperature $T_{amb}$, it is also possible to operate radiation source 62 at quasi-constant power over the entire operating temperature range of electronic arrangement 1.

The present invention allows a radiation source 62, such as, for example, a thermal infrared emitter, to be operated in a manner that combines the advantages of constant-voltage operation with those of constant-current operation. In addition to the avoidance or a substantial reduction of the peak lamp current, these advantages include low drift over temperature as well as low drift over the lifetime of the lamp. Another advantage is the relatively low circuit complexity of the proposed electronic arrangement 1. Today, many commercial microcontrollers have an integrated, buffered DAC, so that only a small additional percentage of area falls to the lamp control. In addition, due to the high achievable efficiency (on the order of 90%), it is possible to build efficient optical gas sensors which exhibit little self-heating.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An electronic arrangement comprising:
a radiation source
a controlled voltage converter configured to provide a lamp voltage for the radiation source in order to operate the radiation source in an ON state for a pulse duration, and to regulate the lamp voltage in such a way that a reference voltage at a feedback terminal of the voltage converter is maintained substantially constant; and
a voltage source connected to the feedback terminal and configured to provide, via the feedback terminal for acting on the regulation of the voltage converter, a time-dependent control voltage having a predefined time profile,
wherein the voltage converter is configured to select a time profile for the lamp voltage as a function of the predefined time profile of the time-dependent control voltage in such a way that a power of the radiation source deviates from a constant power value by no more than 25% during at least 90% of the pulse duration.

2. The electronic arrangement as recited in claim 1, wherein a peak inrush current of an input current into the voltage converter, which may occur at the beginning of the pulse duration, has a magnitude less than or equal to 1.25 times an average input current of the voltage converter that is averaged over the pulse duration.

3. The electronic arrangement as recited in claim 1, wherein the pulse duration is in a range of from 50 ms to 500 ms.

4. The electronic arrangement as recited in claim 1, further comprising a voltage divider including a series connection of a first resistor and a second resistor, the voltage divider being connected to the radiation source via the first resistor and to a ground terminal of the electronic arrangement via the second resistor, and the feedback terminal being connected to the voltage divider in a region between the first resistor and the second resistor.

5. The electronic arrangement as recited in claim 1, wherein the voltage source is connected to the feedback terminal via a resistor.

6. The electronic arrangement as recited in claim 1, further comprising a voltage divider including a series connection of a first resistor and a second resistor, the voltage divider being connected to the radiation source via the first resistor and to a ground terminal of the electronic arrangement via the second resistor, and the feedback terminal being connected to the voltage divider in a region between the first resistor and the second resistor, wherein voltage source is connected to the feedback terminal via a third resistor, and wherein the voltage source is connected via the third resistor to the voltage divider in a region between the first resistor and the second resistor.

7. The electronic arrangement as recited in claim 1, wherein an electrical resistance of the radiation source has a positive temperature coefficient.

8. The electronic arrangement as recited in claim 1, wherein the voltage source is or includes a digital-to-analog converter, the time-dependent control voltage being an output voltage of the digital-to-analog converter.

9. An optical gas sensor comprising the electronic arrangement according to claim 1.

10. A method for controlling power of a radiation source, the method comprising:
providing an electronic arrangement comprising:
a radiation source
a controlled voltage converter configured to provide a lamp voltage for the radiation source in order to operate the radiation source in an ON state for a pulse duration, and to regulate the lamp voltage in such a way that a reference voltage at a feedback terminal of the voltage converter is maintained substantially constant; and
a voltage source connected to the feedback terminal and configured to provide, via the feedback terminal for acting on the regulation of the voltage converter, a time-dependent control voltage having a predefined time profile,
wherein the voltage converter is configured to select a time profile for the lamp voltage as a function of the predefined time profile of the time-dependent control voltage in such a way that a power of the radiation source deviates from a constant power value by no more than 25% during at least 90% of the pulse duration;
operating the radiation source in the ON state for the pulse duration; and
providing the time-dependent control voltage in such a manner that the power of the radiation source deviates from the constant power value by no more than 25% during at least 90% of the pulse duration.

11. The method as recited in claim 10, wherein the time profile of the time-dependent control voltage is established as a function of an ambient temperature.

12. The method as recited in claim 10, wherein the time profile of the time-dependent control voltage is established as a function of a thermal resistance of the radiation source and/or of a thermal capacity of the radiation source.

13. The method as recited in claim 10, the electronic arrangement further comprising a voltage divider including a series connection of a first resistor and a second resistor, the voltage divider being connected to the radiation source via the first resistor and to a ground terminal of the electronic arrangement via the second resistor, and the feedback terminal being connected to the voltage divider in a region between the first resistor and the second resistor, wherein voltage source is connected to the feedback terminal via a third resistor, wherein the voltage source is connected via the third resistor to the voltage divider in a region between the first resistor and the second resistor, and wherein, during the pulse duration, the control voltage deviates no more than 20% from a time profile determined by the following equation:

$$v_{DAC} = v_{FB} \frac{R_3}{R_1}\left(1 + \frac{R_1}{R_2} + \frac{R_1}{R_3}\right) -$$

-continued $$\frac{R_3}{R_1}\sqrt{P_{LP}R_{LP,25°C.}\left[1+\alpha\left(R_{th}P_{LP}\left(1-e^{-\frac{t}{R_{th}C_{th}}}\right)+T_{amb}-25°\text{ C.}\right)\right]}$$

where:
- $P_{LP}$ is a predetermined constant power value,
- $R_{LP,25°C.}$ is an electrical resistance of the radiation source at 25° C.,
- $\alpha$ is a temperature coefficient of the radiation source,
- $R_{th}$ is a thermal resistance of the radiation source,
- $C_{th}$ is a thermal capacity of the radiation source, and
- $T_{amb}$ is an ambient temperature.

14. The method as recited in claim 10, wherein the method does not require measurement of current.

15. The method as recited in claim 10, wherein the method does not require measurement of the lamp voltage and/or does not require measurement of the power of the radiation source.

* * * * *